US008170702B2

(12) United States Patent
Kemp et al.

(10) Patent No.: US 8,170,702 B2
(45) Date of Patent: May 1, 2012

(54) METHOD FOR CLASSIFYING AUDIO DATA

(75) Inventors: Thomas Kemp, Esslingen (DE); Yin Hay Lam, Stuttgart (DE); Marta Tolos Rigueiro, Vilassar de Mar (ES)

(73) Assignee: Sony Deutschland GmbH, Cologne (DE)

( * ) Notice: Subject to any disclaimer, the term of this patent is extended or adjusted under 35 U.S.C. 154(b) by 883 days.

(21) Appl. No.: 11/908,944

(22) PCT Filed: Mar. 15, 2006
(Under 37 CFR 1.47)

(86) PCT No.: PCT/EP2006/002398

§ 371 (c)(1),
(2), (4) Date: Aug. 25, 2008

(87) PCT Pub. No.: WO2006/097299

PCT Pub. Date: Sep. 21, 2006

(65) Prior Publication Data

US 2009/0069914 A1 Mar. 12, 2009

(30) Foreign Application Priority Data

Mar. 18, 2005 (EP) .................................... 05005994

(51) Int. Cl.
*G06F 17/00* (2006.01)
(52) U.S. Cl. ......................................................... 700/94
(58) Field of Classification Search ..................... 700/94
See application file for complete search history.

(56) References Cited

U.S. PATENT DOCUMENTS

2003/0045953 A1 3/2003 Weare
2003/0069728 A1 4/2003 Tato et al.
2003/0144838 A1 * 7/2003 Allegro ......................... 704/233
2005/0160449 A1 7/2005 Goronzy et al.

OTHER PUBLICATIONS

U.S. Appl. No. 12/593,927, filed Sep. 30, 2009, Kemp.
U.S. Appl. No. 12/369,352, filed Feb. 11, 2009, Kemp.
Office Action issued Feb. 25, 2011, in European Patent Application No. 05005994.8.
Tolos, M. et al.,"Mood-based Navigation Through Large Collctions of Musical Data", IEEE Consumer Communications and Networking Conference, pp. 71-75, 2005.
Kodama, Y. et al.,"A Music Recommendation System", IEEE, pp. 219-220, 2005.
Feng, Y. et al., Musical Information Retrieval by Detecting Mood via Computational Media Aesthetics, Proceedings of the IEEE/WIC International Conference on Web Intelligence, IEEE, pp. 235-241, 2003.
Office Action issued Dec. 1, 2010, in Chinese Patent Application No. CPEL0753017P (submitting English translation only).
Office Action issued Oct. 13, 2010, in Europe Patent Application No. 05 005 994.8.

(Continued)

*Primary Examiner* — Andrew C Flanders
(74) *Attorney, Agent, or Firm* — Oblon, Spivak, McClelland, Maier & Neustadt, L.L.P.

(57) ABSTRACT

A method for classifying audio data. For a given piece of audio data a location or position for the given audio data within a mood space is generated and compared to a comparison mood space location. As a result of the comparison, comparison data are generated and provided as a classification result with respect to the given audio data.

11 Claims, 4 Drawing Sheets

OTHER PUBLICATIONS

Tao Li, et al., "Detecting Emotion in Music", 2003, The Johns Hopkins University, pp. 239-240.
Jean-Julien Aucouturier, et al., "Finding Songs that Sound the Same", Proc. 1st IEEE Benelux Workshop on Model based Processing and Coding of Audio, Nov. 15, 2002, pp. 91-98.
Dan Liu, et al., "Automatic Mood Detection from Acoustic Music Data", 2003, The Johns Hopkins University, pp. 81-87.
Summons to attend oral prodeedings pursuant to Rule 115(1) EPC issued Apr. 15, 2011, in Application No. / Patent No. 05005994.8-1224 / 1703491.

* cited by examiner

Mood Space Model

Mood Space Model

METHOD FOR CLASSIFYING AUDIO DATA

The present invention relates to a method for classifying audio data. The present invention more particularly relates to a fast music similarity computation method based on e.g. N-dimensional music mood space relationships.

Recently, the classification of audio data and in particular of pieces of music becomes more and more important as many electronic devices and in particular customer devices enable a respective user to store and manage a large plurality of music items and titles. In order to enhance the managing mechanism for such music data basis it is necessary to obtain a comparison between different pieces of audio data or different pieces of music in an easy and fast manner.

Therefore, a variety of mechanisms have been developed in order to extract from an analysis of audio data particular properties and features in order to compare pieces of music by comparing the respective sets or n-tuples of properties and features. However, many of the known features to be evaluated within such a comparison mechanism are difficult to calculate and the computational burden is in some cases not reasonable.

It is an object underlying the present invention to provide a method for classifying audio data which enables a reliable and easy and fast to compute comparison and classification of audio data.

The object is achieved according to the present invention by a method for classifying audio data with the features of independent claim 1. Preferred embodiments of the invention method for classifying audio data are within the scope of the dependent subclaims. The object underlying the present invention is also achieved by an apparatus for classifying audio data, by a computer program product, as well as by a computer readable storage medium according to independent claims 18, 19 and 20, respectively.

The method for classifying audio data according to the present invention comprises a step (S1) of providing audio data in particular as input data, a step (S2) of providing mood space data which define and/or which are descriptive or representative for a mood space according to which audio data can be classified, a step (S3) of generating a mood space location within said mood space for said given audio data, a step (S4) of providing at least one comparison mood space location within said mood space, a step (S5) of comparing said mood space location for said given audio data with said at least one comparison mood space location and thereby generating comparison data, and a step (S6) of providing as a classification result said comparison data in particular as output data which can be used in subsequent classification steps, mainly in detailed comparison steps.

It is therefore a key idea of the present invention to obtain from an analysis of given audio data a position or location within a mood space wherein said mood space is pre-defined or given by mood space data. Then the given audio data can be classified or compared by comparing the derived mood space location for said given audio data with said at least one comparison mood space location. The thereby generated comparison data or classification data are provided as a classification result or a comparison result. It is therefore essential to have for a given piece of audio data a position or location, e.g. by means of coordinate n-tuple, which can easily compared with other locations or positions in said mood space, e.g. by simply comparing the respective coordinates of the position or location. Therefore audio data can easily be classified and compared with other audio data.

According to a preferred embodiment of the method for classifying audio data according to the present invention said mood space may be or may be modelled by at least one of an Euclidean space model, a Gaussian mixture model, a neural network model, and a decision tree model.

Additionally or alternatively, according to a further preferred embodiment of the method for classifying audio data according to the present invention said mood space may be or may be modelled by an N-dimensional space or manifold and N may be a given and fixed integer.

Further additionally or alternatively, said comparison data may be alternatively or additionally at least one of being descriptive for, being representative for and comprising at least one of a topology, a metric, a norm, a distance defined in or on said mood space according to a another embodiment of the method for classifying audio data according to the present invention.

Additionally or alternatively, said comparison data and in particular said topology, metric, norm, and said distance may be obtained based on at least one of said Euclidean space model, said Gaussian mixture model, said neural network model, and said decision tree model according to an advantageous embodiment of the method for classifying audio data according to the present invention.

Said comparison data may be derived based on said mood space location within said mood space for said given audio data and they may be based on said comparison mood space location within said mood space according to an additional or alternative embodiment of the method for classifying audio data according to the present invention.

Said mood space and/or the model thereof may be defined based on Thayer's music mood model according to an additional or alternative embodiment of the method for classifying audio data according to the present invention.

According to a further preferred embodiment of the method for classifying audio data according to the present invention said mood space and/or the model thereof may be at least two-dimensional and may be defined based on the measured or measurable entities stress S( ) describing positive, e.g. happy, and negative, e.g. anxious moods and energy E( ) describing calm and energetic moods as emotional or mood parameters or attributes.

Further additionally or alternatively, according to a still further preferred embodiment of the method for classifying audio data according to the present invention said mood space and/or the model thereof are at least three-dimensional and are defined based on the measured or measurable entities for happiness, passion, and excitement.

Said step (S4) of providing said at least one comparison mood space location may additionally or alternatively comprise a step of providing at least one additional audio data in particular as additional input data and a step of generating a respective additional mood space location for said additional audio data, and wherein said respective additional mood space location for said additional audio data is used for said at least one comparison mood space location according to an additional or alternative embodiment of the method for classifying audio data according to the present invention.

At least two samples of audio data may be compared with respect to each other—one of said samples of audio data being assigned to said derived mood space location and the other one of said of audio data being assigned to said additional mood space location or said comparison mood space location—in particular by comparing said derived mood space location and said additional mood space location or said comparison mood space location.

Further additionally or alternatively, according to a still further preferred embodiment of the method for classifying audio data according to the present invention said at least two samples of audio data to be compared with respect to each other may be compared with respect to each other based on said comparison data in a pre-selection process or comparing pre-process and then based on additional features, e.g. based on features more complicated to calculate and/or based on frequency domain related features, in a more detailed comparing process.

In this case said at least two samples of audio data to be compared with respect to each other may be compared with respect to each other in said more detailed comparing process based on said additional features, if said comparison data obtained from said pre-selection process or comparing pre-process are indicative for a sufficient neighbourhood of said at least two samples of audio data.

Alternatively, a plurality of more than two samples of audio data may be compared with respect to each other.

Alternatively or additionally, said given audio data may be compared to a plurality of additional samples of audio data.

In these cases from said comparison a comparison list and in particular a play list may be generated which is descriptive for additional samples of audio data of said plurality of additional samples of audio data which are similar to said given audio data.

According to a further preferred and advantageous embodiment of the method for classifying audio data according to the present invention music pieces are used as samples of audio data According to a further aspect of the present invention, an apparatus for classifying audio data is provided which is adapted and which comprises means for carrying out a method for classifying audio data according to the present invention and the steps thereof.

According to a further aspect of the present invention a computer program product is provided comprising computer program means which is adapted to realize the method for classifying audio data according to the present invention and the steps thereof, when it is executed on a computer or a digital signal processing means.

Additionally a computer readable storage medium is provided which comprises a computer program product according to the present invention.

These and further aspects of the present invention will be further discussed in the following:

Concept

The present invention inter alia relates to a fast music similarity computation method which is in particular based on a N-dimensional music mood space.

It is proposed that a N-dimensional music mood space can be used to limit the number of candidates and hence reduce the computation in similarity list generation. For each of the music piece in a huge database, its location in a N-dimensional music mood space is first determined and only music pieces which are close to the music in the mood space are selected and the similarity are computed between the given music and the pre-selected music pieces.

BACKGROUND

Music similarity is a relatively new topic, and at this moment, the interest into it is quite academic. Systems have been developed that compare music pieces with one another using statistics over what is called 'timbre'—a mixture of a variety of low-level features. Various distance measures have been proposed including expensive methods like Monte-Carlo-simulation of samples of a distribution and probability estimation of the artificial samples using the statistics from the other music piece. See e.g. [3] for details.

The state of the art in emotion recognition in music is a rather new topic. While a huge amount of papers have been written about music processing in general, few papers have been published regarding emotion in music. State of the art system used for emotion classification in music classifiers include Gaussian mixtures models, support vector machines, neural networks etc.

There are also studies about perception of emotion in music, but the results are still very preliminary. Reference [1] and [2] provides information about the state-of-the art mood detection techniques.

Problem

For applications which involved music retrieval or music suggestion, a music play list is usually displayed and songs in the play list are usually based on the similarity between the query music and the rest of the music in the database. Nowadays, typical commercial music database consists of hundreds of thousands of music. For each of the music in the database, state-of-the-art system usually compute its similarity to all the other music pieces in the database to generate a similarity list. Based on the applications, a play list is then generated from the similarity list. The computation required in similarity generation involved about N*N/2 similarity measure computation, where N is the number of songs in the database. For example, if the number of songs in the database is 500,000, then the computation will be 500,000*500,000/2, which is not practical for real applications.

In this proposal, a fast music similarity list generation method based on mood space are proposed. The emotion expressed in different music are usually different. Some music are perceived as happy by the listeners, but the other songs might be perceived as sad. On the other hand, among songs with similar mood or emotion, listeners generally can distinguish the difference in the degree of emotion expression. For example, one music is happier than the other one, etc. In additional, music with different mood usually are considered as dissimilar. The music similarity list generation approach described in this invention proposal exploits such emotion perception as described above.

In this proposal, we first proposed that the emotion of music can be described by a N-dimensional mood space. Each dimension describes the extent of a particular emotion attribute. For each of the music in the database, the value of each emotion attribute are first generated. According to the coordinates of a particular music in this N-dimensional space, music that are located in the proximity of the given music are first selected. After the pre-selection stage, instead of computing the similarity of the given music to the rest of the database, only the similarity between the given music and the pre-selected music are computed.

Any music emotion/mood model proposed in the literature can be used to construct the N-dimensional mood space. For example, the two-dimensional model proposed by Thayer [1]. The model adopts the theory that the mood is entrailed from two factors stress (positive/negative) and energy (calm/energetic). According to Thayer's mood model, any music can be described by a stress value and an energy value and such values give the coordinates of a given music and hence determine the location of the emotion in the mood space. In FIG. 1*a*, the stress value and energy value of music x is S(x) and E(x) respectively and the mood of x is a function of the emotion attribute, i.e. mood(x)=f(E(x), S(x)), where f can be any function. As mentioned above, two music that are close to each other in the mood space, such as music x and music y, are considered to be similar as they are both considered as "contentment". On the other hand, an "Anxious" music such as z is far away from x in the mood space and anxious music such as z are generally not perceived as similar to a "contentment" music such as x. The similar concept is not limited to Thayer model, it can be extended to any N-dimensional model. For example, in FIG. 1*b*, a three dimensional mood space is depicted. Its coordinates describes the degree of happiness, passion and excitement respectively.

The coordinates of a music in the mood space is proposed to be generated from any machine learning algorithms such as Neural Network, Decision Tree and Gaussian Mixture Models etc. For example, taking FIG. 1*b* as an example, Gaussian Mixture Models, i.e., passion model, happiness model and excitement model can be used to model each mood dimension. Such mood models are trained beforehand. For a given music, each model will generate a score and such score can be used as the coordinates value in the mood space.

After the location of the music in the mood space are determined, music pieces that are close to a given music in the mood space are identified by using simple distance measure such as Euclidean distance, Mahalanobis distance or Cosine angles etc.

For example, in FIG. 2, only music pieces that fall within the proximity area, e.g. circle A, are considered as close to music x in the mood space and music z is considered as too far away and hence dissimilar to music x. According to the distance, the system can either select N music pieces that are close to the given music or a distance threshold can be set and only music distance smaller than the threshold will be selected.

To generate a similarity list for music x, a similarity measure is introduced to compute the similarity between music x and the pre-selected music piece. The similarity measure can be any known similarity measure algorithms, e.g., each music is modelled by Gaussian Mixture Model. Any model distance criterion (see e.g. [3]) can then be used to measure the distance between the two Gaussian Models.

Advantages

The main advantage is the significant reduction in computation to generate music similarity lists for a large database without affecting the similarity ranking performance from the perceptual point of view.

The invention will now be explained based on preferred embodiments thereof and by taking reference to the accompanying and schematical figures.

Figure 1A:
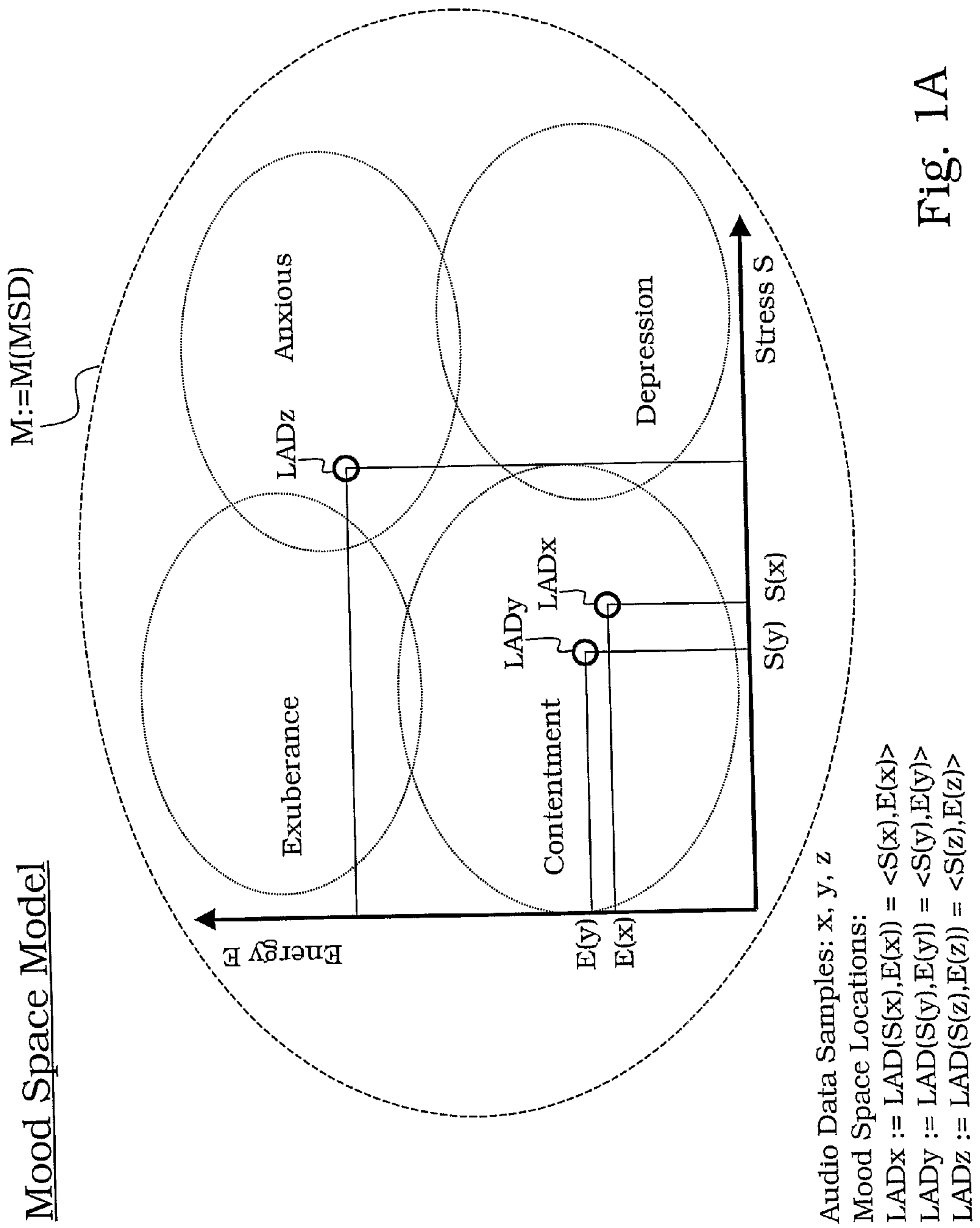
FIG. 1A is a schematical diagram of a mood space model which can be involved in an embodiment of the inventive method for classifying audio data.
Figure 2:
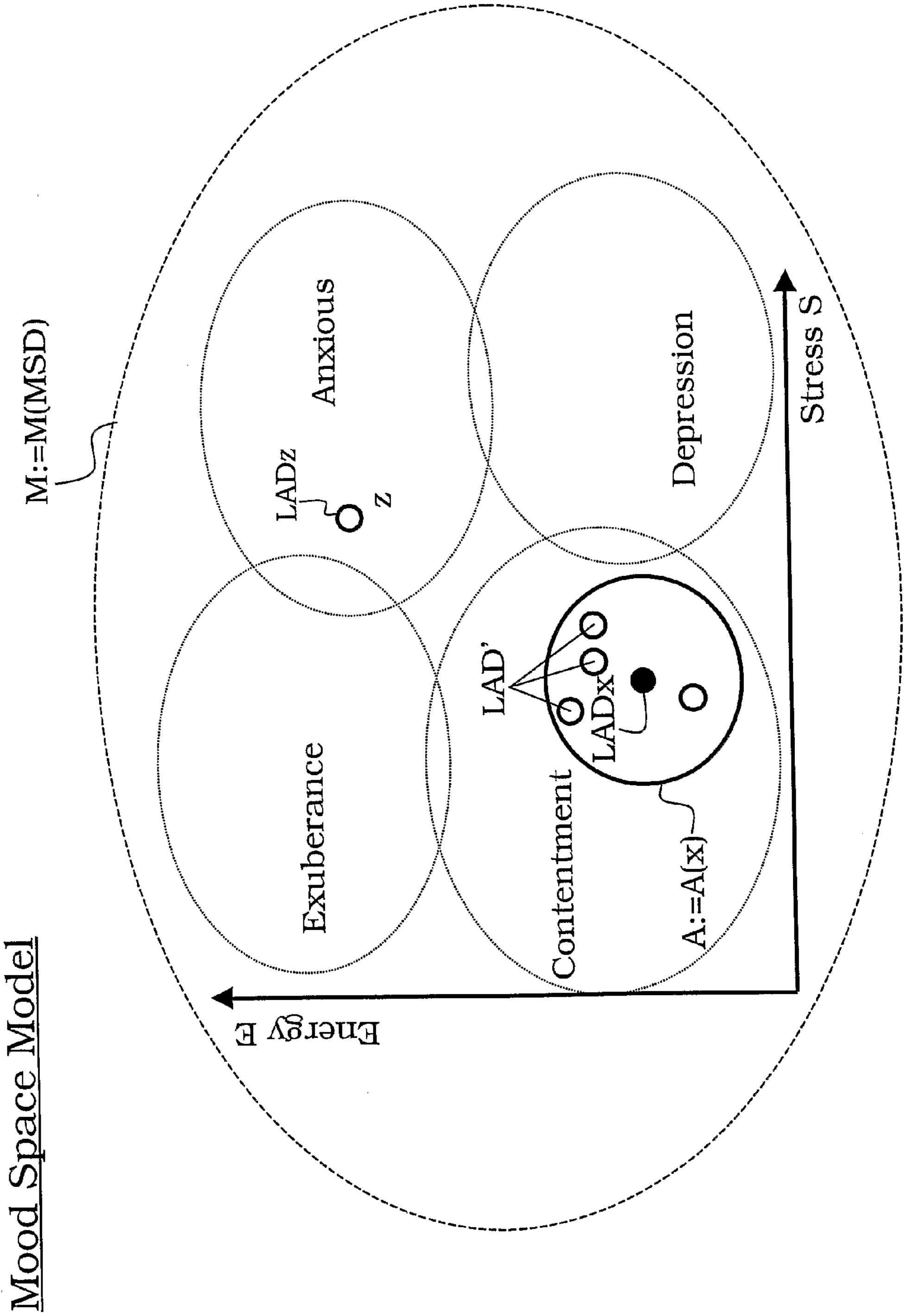

FIG. 2 elucidates by means of a schematical diagram a proximity concept which can be involved in the embodiment for the inventive method for classifying audio data as illustrated in FIG. 1A.

Figure 3:
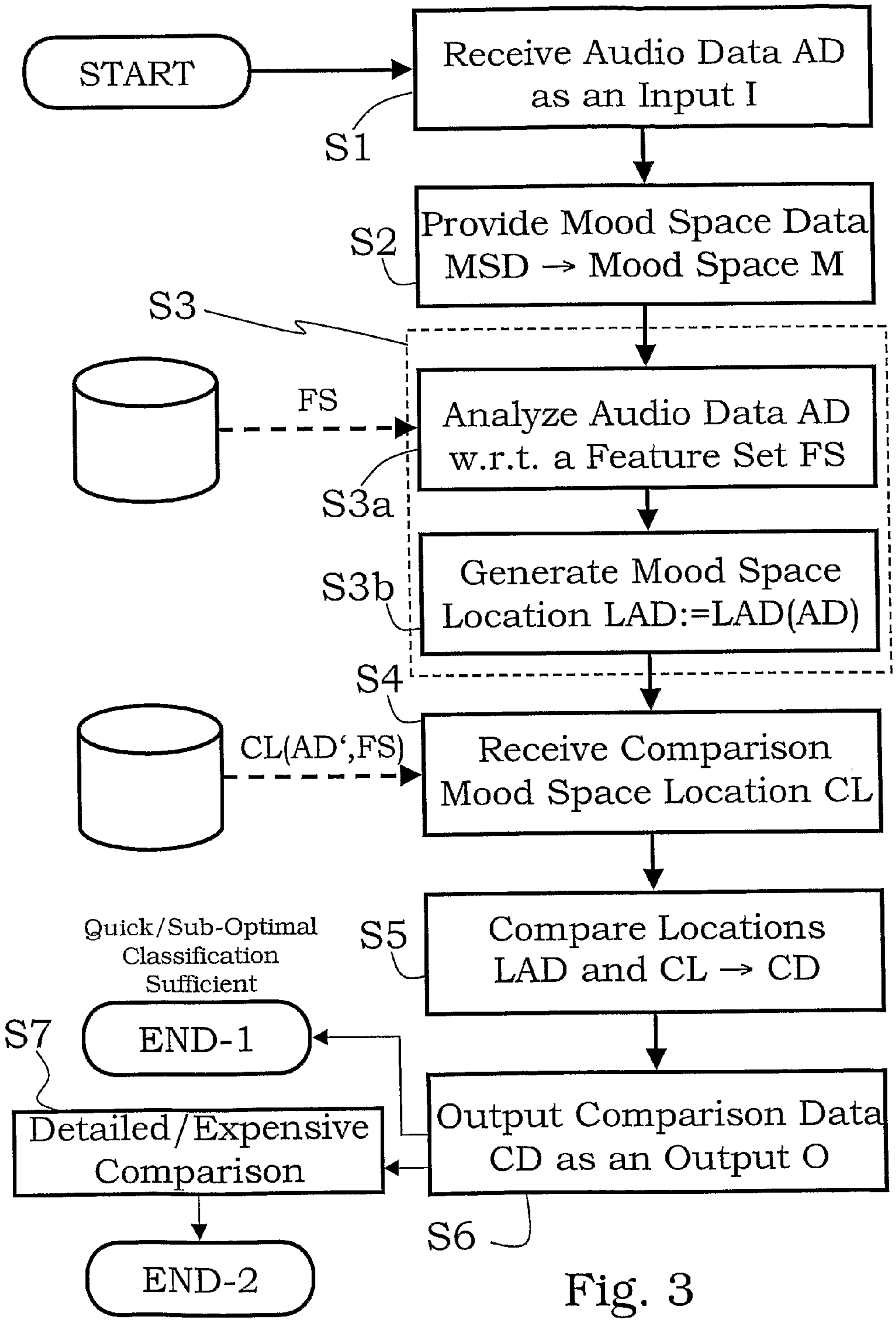

FIG. 3 is a schematical diagram which elucidates basic aspects of the inventive method for analyzing audio data according to a preferred embodiment by means of a flow chart.

In the following functional and structural similar or equivalent element structures will be denoted with the same reference symbols. Not in each case of their occurrence a detailed description will be repeated.

FIG. 1A demonstrates by means of a graphical representation in a schematical manner a model for a mood space M which can be involved for carrying out the method for classifying audio data according to a preferred embodiment of the prevent invention.

The mood space M shown in FIG. 1A is based, defined and constructed according to so-called mood space data MSD. Locations or positions within said mood space M and in order to navigate within said mood space M are the entities stress S and energy E. Therefore, the model shown in FIG. 1A is a two-dimensional mood space model for said mood space M. In the coordinate system defined by the two axes for stress S and energy E, three locations for three different sets of audio data AD, AD' are indicated. The respective sets of audio data AD, AD' are called x, y, and z, respectively. In the embodiment shown in FIG. 1A the first set of audio data AD which is called x serves as given audio data x. Based on the evaluation of the entities stress S and energy E for said first set of audio data x respective parameter values S(x) and E(x) are generated. Therefore, the respective location LADx for said first set or sample of audio data x is a function of said measured values S(x), E(x). In the simplest case of a representation the location LADx for audio data x is simply the pair of values S(x), E(x), i.e.

$$LADx := LAD(S(x),E(x)) = \langle S(x),E(x) \rangle.$$

The same may hold for second and third audio data y and z with measurement values S(y), E(y) and S(z), E(z), respectively. According to the general properties for the locations or positions LADy and LADz in said mood space M the following expressions are given:

$$LADy := LAD(S(y),E(y)) = \langle S(y),E(y) \rangle$$

and $$LADz := LAD(S(z),E(z)) = \langle S(z),E(z) \rangle.$$

As can be seen from the representation of FIG. 1A, under the assumption that a distance function is valid in the Euclidean manner, audio data x and y are close together with respect to each other, whereas audio data z are at a distal position with respect to said first and second audio data x and y, respectively.

Additionally certain regions of the complete mood space M can be assigned to certain characteristics moods such as contentment, depression, exuberance, and anxiousness.

Figure 1B:
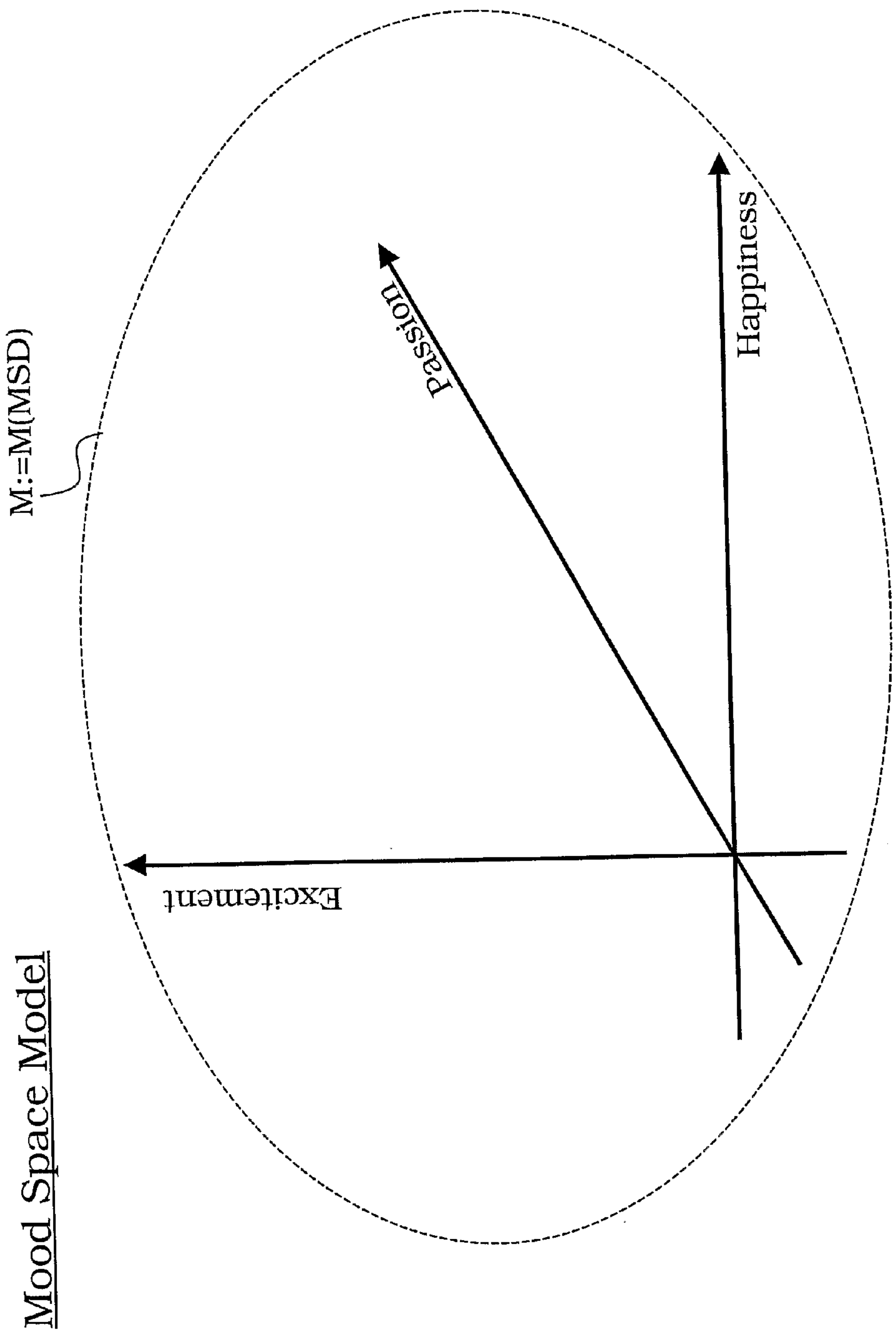
FIG. 1B is a schematical diagram of a mood space model which can be involved in another embodiment of the inventive method for classifying audio data.

FIG. 1B demonstrates by means of a graphic representation in a schematic way that also more than two dimensions in said mood space M are possible. In the case of FIG. 1B one has three dimensions with the entities happiness, passion and excitement defining the respective three coordinates within said mood space M.

FIG. 2 demonstrates in more detail the notion and the concept of neighbourhood and vicinity for the embodiment already demonstrated in FIG. 1A. Here one has the original audio data x with a respective location or position LADx in said mood space M. With respect to a given concept of distance or metric one can generate or receive a threshold value which might be used in order to realize or define neighbourhoods A(x) for said audio data x within said mood space M. The shown neighbourhood A(x) for said audio data x is a circle with the position LADx for said first audio data x in its centre and having a radius with respect to the distance or matric underlying the neighbourhood concept discussed here which is equal to the chosen threshold value. Any additional audio data AD within said neighbourhood circle A(x) are assumed to be comparable and similar enough when compared to said first and given audio data x. In contrast, additional audio data z is too far away with respect to the underlying distance or matric so that z can be classified as being not comparable to said given and first audio data x. Such a concept of vicinity or neighbourhood can be used in order to compare a given sample of audio data x with a data base of audio samples, for instance in order to reduce computational burden when comparing audio data samples with respect to each other. In the case shown in FIG. 2 a pre-selection process is carried out based on the concept of distance and metric in order to select a much more refined subset from the whole data base containing only a very few samples of audio data which have to be compared with respect to each other or with respect to a given piece of audio data x.

FIG. 3 is a schematical block diagram containing a flow chart for the most prominent method steps in order to realize an embodiment of the method for classifying audio data AD according to the present invention.

After initialization step START a sample of audio data AD is received as an input I in a first method step S1.

Then, in a following step S2 information is provided with respect to a mood space underlying the inventive method. Therefore in step S2 respective mode space data MSD are provided which define and/or which are descriptive or representative for said mood space M according to which audio data AD, AD' can be classified and compared.

A step S3 follows wherein a mood space location LAD for said given audio data AD within said mood space M is generated. Contained is a substep S3*a* for analyzing said audio data AD, e.g. with respect to a given feature set FS which might be obtained from a respective data base. In the following substep S3*b* the mood space location LAD for said audio data AD is generated as a function of said audio data AD:

$$LAD{:=}LAD(AD).$$

In the following step S4 a comparison mood space location CL is received, for instance also from a data base. Said comparison mood space location CL might be dependent on one or a plurality of additional audio data AD' to which the given audio data AD shall be compared to. Additionally in this case the comparison mood space location CL might also be dependent on the feature set FS underlying the present classification scheme.

In the following step S5 the locations LAD for the given sample of audio data AD and the comparison location are compared in order to generate respective comparison data CD. Said comparison data CD might also be realized by indicating a distance between said locations LAD and CL.

In the following step S6 the comparison data CD are given as an output ○.

Finally, the process demonstrated in FIG. 3 is terminated either with a process step END-1 if a quick and sub-optimal classification is sufficient or with—after a detailed and expensive classification S7 is needed—with an alternative process step END-2.

CITED LITERATURE

[1] Dan Liu, Li Lu & Hong-Jiang Zhang, "Automatic mood detection from acoustic music data", Proceedings of the Fourth International Conference on Music Information Retrieval (ISMIR) 2003.

[2] Tao Li & Mitsunori Ogihara, "Detecting emotion in music", Proceedings of the Fourth International Conference on Music Information Retrieval (ISMIR) 2003.

[3] J. J. Aucouturier & F. Pachet, "Finding songs that sound the same", in Proc. Of the IEEE Benelux Workshop on model based processing and coding of audio, November 2002.

REFERENCE SYMBOLS

A, A(x) neighbourhood, vicinity, neighbourhood or vicinity w.r.t. mood space location for audio data x AD audio data, audio data sample AD' audio data, audio data sample, additional audio data CD comparison data CL comparison mood space location E, E( ) energy FS feature set I input, input data LAD, LADx, LADy, mood space location for received audio data AD, x, y, LADz z respectively LAD' additional mood space location for received additional audio data AD'

M mood space

MSD mood space data

○ output, output data

S, S( ) stress x audio data, audio data sample y audio data, audio data sample z audio data, audio data sample

The invention claimed is:

1. A method for selecting audio data, comprising:

a pre-selection process including:

providing mood space data representative of a mood space for classifying audio data, providing first audio data and generating a first mood space location within the mood space for the first audio data, providing second audio data and generating a second mood space location for the second audio data, and determining whether the second audio data is within a pre-defined neighborhood space around the first audio data by generating comparison data indicating a distance, in the mood space, between the first mood space location and the second mood space location;

a detailed comparing process including comparing, based on frequency domain related features, the first audio data and the second audio data only when the comparison data from the pre-selection process indicates the second audio data is within the pre-defined neighborhood space, wherein a plurality of other audio data are compared with respect to the first audio data according to the pre-selection process and the detailed comparing process; and generating a play list based on the comparisons of the second audio data and the other audio data with the first audio data to include audio data thereof similar to the first audio data.

2. The method according to claim 1, wherein the mood space is or is modeled by at least one of a Gaussian mixture model, a neural network model, or a decision tree model.

3. The method according to claim 1, wherein the mood space is or is modeled by an N-dimensional space or manifold, and N is a given and fixed integer.

4. The method according to claim 1, wherein the comparison data are at least one of descriptive for, representative for, or comprising at least one of a topology, a metric, a norm, and a distance defined in, or on the mood space.

5. The method according to claim 4, wherein the comparison data or the topology, metric, norm, and the distance are obtained based on at least one of a Euclidean space model, a Gaussian mixture model, a neural network model, or a decision tree model.

6. The method according to claim 1, wherein the mood space is defined based on Thayer's mood model.

7. The method according to claim 1, wherein the mood space is two-dimensional and is defined based on measured or measurable entities describing happy and anxious moods and energy describing calm and energetic moods as emotional or mood parameters or attributes.

8. The method according to claim 1, wherein the mood space is three-dimensional and is defined based on measured or measurable entities for happiness, passion, and excitement.

9. The method according to claim 1, wherein the generated playlist consists of audio data similar to the first audio data.

10. A non-transitory computer-readable medium including executable instructions, which when executed by a processor, cause the processor to perform a method for selecting audio data, comprising:

a pre-selection process including:

providing mood space data representative of a mood space for classifying audio data, providing first audio data and generating a first mood space location within the mood space for the first audio data, providing second audio data and generating a second mood space location for the second audio data, and determining whether the second audio data is within a pre-defined neighborhood space around the first audio data by generating comparison data indicating a distance, in the mood space, between the first mood space location and the second mood space location;

a detailed comparing process including comparing, based on frequency domain related features, the first audio data and the second audio data only when the comparison data from the pre-selection process indicates the second audio data is within the pre-defined neighborhood space, wherein a plurality of other audio data are compared with respect to the first audio data according to the pre-selection process and the detailed comparing process; and generating a play list based on the comparisons of the second audio data and the other audio data with the first audio data to include audio data thereof similar to the first audio data.

11. An apparatus for selecting audio data, comprising:

means for performing a pre-selection process including:

providing mood space data representative of a mood space for classifying audio data, providing first audio data and generating a first mood space location within the mood space for the first audio data, providing second audio data and generating a second mood space location for the second audio data, and determining whether the second audio data is within a pre-defined neighborhood space around the first audio data by generating comparison data indicating a distance, in the mood space, between the first mood space location and the second mood space location;

means for performing a detailed comparing process including comparing, based on frequency domain related features, the first audio data and the second audio data only when the comparison data from the pre-selection process indicates the second audio data is within the pre-defined neighborhood space, wherein a plurality of other audio data are compared with respect to the first audio data according to the pre-selection process and the detailed comparing process; and means for generating a play list based on the comparisons of the second audio data and the other audio data with the first audio data to include audio data thereof similar to the first audio data.

* * * * *